United States Patent [19]

Roatcap

[11] 4,067,471
[45] Jan. 10, 1978

[54] THREE POINT TRACTOR HITCH BOOM ATTACHMENT

[76] Inventor: Ralph M. Roatcap, 18540 E. Telegraph Road, Santa Paula, Calif. 93060

[21] Appl. No.: 712,163

[22] Filed: Aug. 6, 1976

[51] Int. Cl.² .............................................. E02F 3/62
[52] U.S. Cl. .................................... 214/766; 172/439
[58] Field of Search .................. 214/130 R, 766, 450, 214/77 R; 172/247, 251, 439

[56] References Cited

U.S. PATENT DOCUMENTS

| 3,048,228 | 8/1962 | Hess et al. | 172/439 |
| 3,368,706 | 2/1968 | Vaalimaa et al. | 214/766 |
| 3,468,442 | 9/1969 | Sarvela et al. | 214/766 |
| 3,667,632 | 6/1972 | Tidswell | 214/130 R |
| 3,851,780 | 12/1974 | Martin | 214/766 |

FOREIGN PATENT DOCUMENTS 81,951  1/1957  Denmark ............................. 214/766

Primary Examiner—Robert J. Spar
Assistant Examiner—Ross Weaver

[57] ABSTRACT

A tractor attachment comprised of a lifting boom hinged to a base carried by an A-frame or the like as part of the three point hitch system that is moveable vertically and adjustable as to height. The boom swings upward by means of an extensible actuator operable between the base and a lever that positions an adapter on which the boom is replaceable to receive a drop line or the like at its terminal end.

10 Claims, 4 Drawing Figures

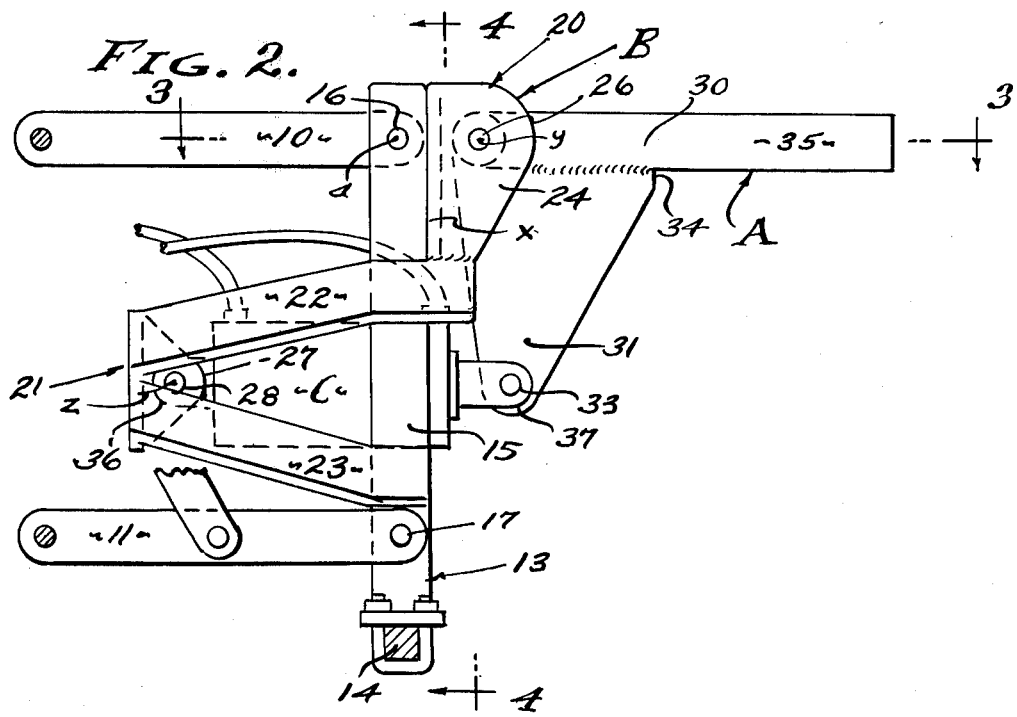
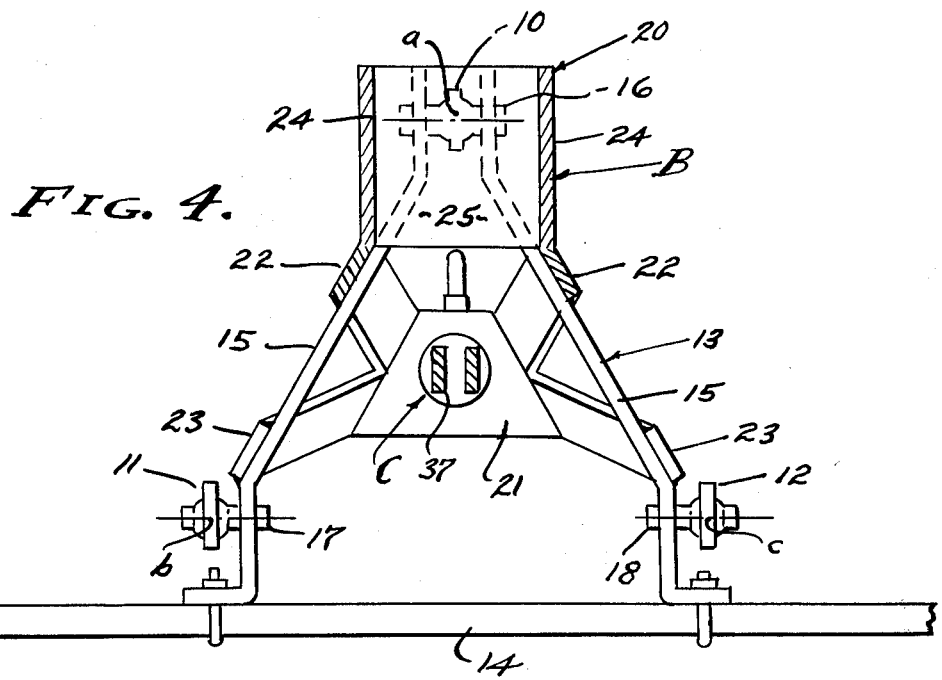

THREE POINT TRACTOR HITCH BOOM ATTACHMENT

BACKGROUND:

Tractors used for agricultural purposes and the like are characterized by various hydraulically operated facilities, among which is the three point hitch. This hitch is comprised of three points of attachment for draft tools as circumstances require, a top center hitch and a pair of spaced lower hitches. These three hitches are moveable points of connection which cooperate as a system of levers, and in practice the lowermost pair of hitches involves a pair of draft links that pivot from the tractor frame to support an implement or the like, most often incorporating a transverse implement bar to which the implements are attached. The uppermost hitch also involves a link, all of which articulate freely and are subject to adjustments. Operation of this three point tractor system is by means of a cylinder and piston unit, or the like, operable to articulate the three levers in unison. Although the points are variable as to position, their relationship is set up so as to accommodate an A-frame attachment at pivot points such as to establish a parallelogram with respect thereto, or substantially so. In practice, the A-frame has two lower legs attached to the two lower hitches, and it has an apex attached to the upper hitch. This A-frame is then adjustable vertically by means of raising or lowering the three hitch points and positioning the same with a hydraulic actuator unit therefor. For whatever purpose may prevail, the A-frame and transverse implement bar remain installed as a permanent facility.

With the foregoing in mind, it will be apparent that hydraulics is available on such tractors, to operate the various cylinder and piston means that are involved. Furthermore, it will be understood that space availability for additional features is limited. Obviously, the three point hitch has its great advantage in leveling the implements that are attached thereto, and on occasions the three point hitch is called upon to operate as a lift. However, the three point hitch is per se a short coupled feature and is not far reaching nor adaptable to varied loads and awkward positions thereof. Therefore, it is an object of this invention to provide a boom attachment to the three point hitch, whereby varied load situations are accommodated with facility.

It is the A-frame which characterizes the three point hitch, or an equivalent form thereof. In any case, there are the obvious top center point and spaced lower points of attachment, all of which are extended a short distance from their pivotal suspension points with the tractor frame. Consequently, there is limited space between the tractor frame and the aforementioned A-frame, and it is this space which provides for the accommodation of the attachment herein disclosed. Accordingly, it is an object of this invention to provide a boom attachment to the said A-frame, to be carried thereby and to cooperatively operate therewith to lift loads as circumstances require.

Attachments are most often cumbersome and interfere with other devices, and consequently must be removed when not in use. However, with the present invention the foundation or base of the attachment is permanently installed and ever ready for a boom extension which characterizes the invention. Accordingly, it is an object to provide permancy in an attachment of the character referred to, whereby the tractor is equipped with a lifting boom facility.

It is an object of this invention to provide a three point and lifting boom combination wherein cooperative efforts are employed, and so that the limitations of one device are enhanced by the other. That is, the three point hitch moves vertically while the boom swings through an arc. It is to be noted that the usual winch system of a crane is not required herein, and in essence is replaced, unobviously, by the vertical lift features of the three point hitch. With the present invention, the live line as used with booms and cranes for vertical lifting is replaced with a drop line, and the vertical lift function is provided by vertical movement of the three point hitch and A-frame which supports the instant attachment.

DRAWINGS:

The various objects and features of this invention will be fully understood from the following detailed description of the typical preferred form and application thereof, throughout which description reference is made to the accompanying drawings, in which:

FIG. 2 is a view similar to FIG. 1 showing the combined three point tractor hitch and boom attachment in a normal lowered condition, with the boom removed.

Figure 1:
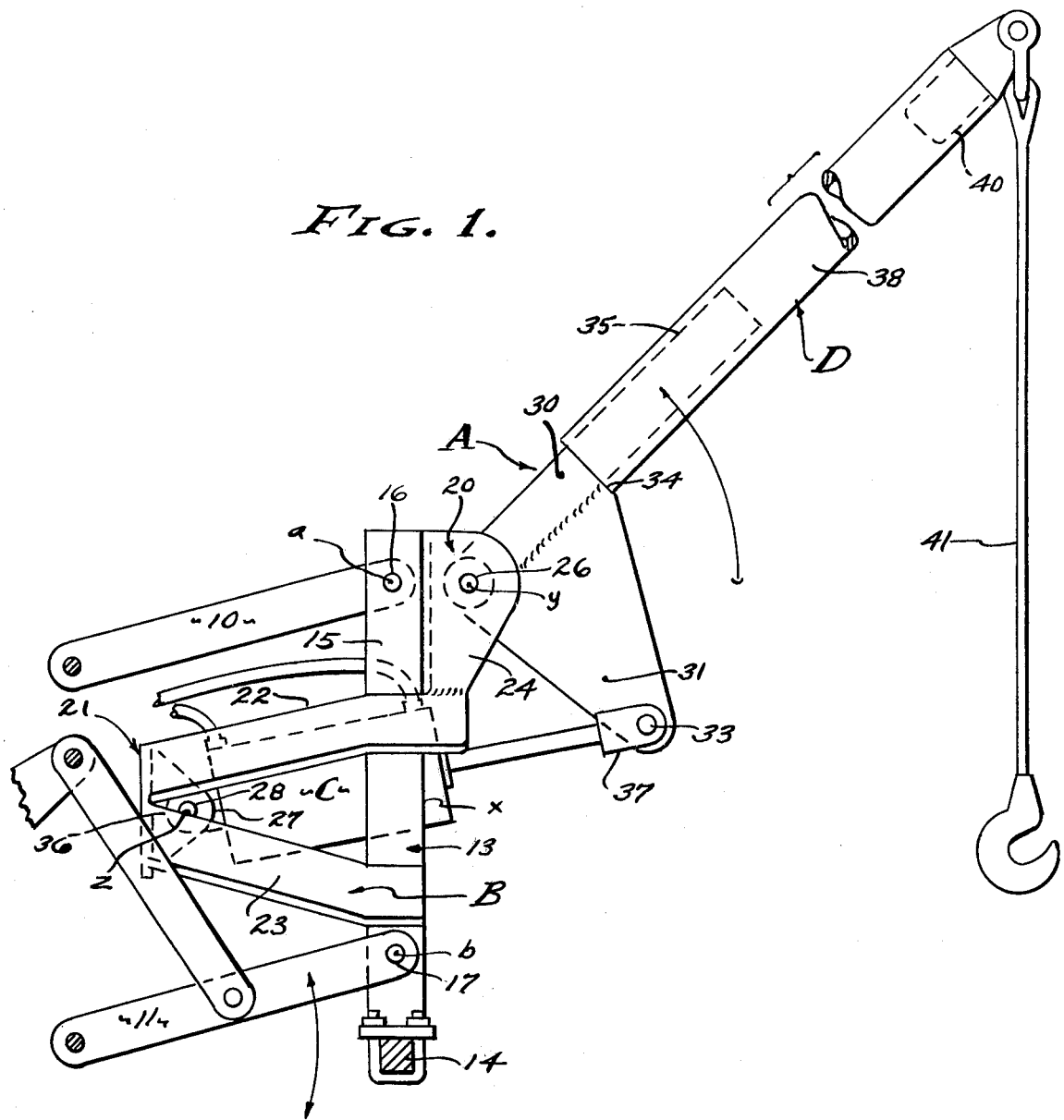
FIG. 1 is a side elevation of the combined three point tractor hitch and boom attachment of the present invention, showing the same in a lifted condition.
Figure 3:
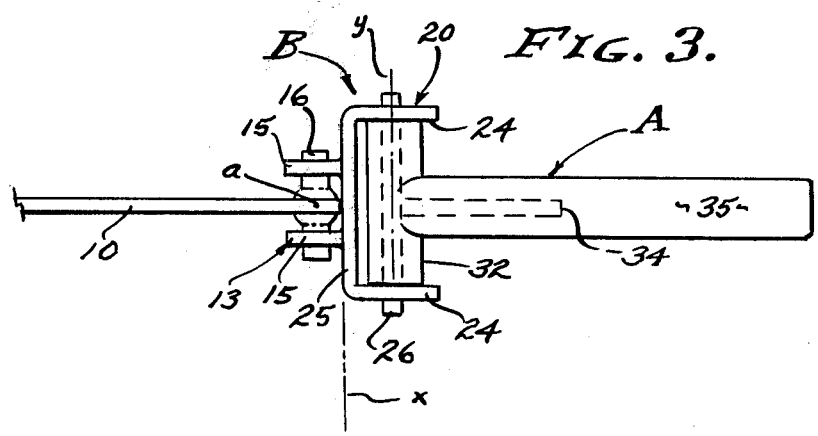

FIGS. 3 and 4 are sectional views taken substantially as indicated by lines 3—3 and 4—4 on FIG. 2 respectively.

PREFERRED EMBODIMENT:

Referring now to the drawings, the tractor is equipped with hydraulics for operation of its various features, in this case the three point hitch which comprises the three points of attachment involving a top link 10 and a pair of spaced lower links 11-12 extending rearward from the tractor frame. The three links 10-12 swing vertically by means of connection to a hydraulic operating unit taking the feasible form of the ramshaft or rockshaft of the tractor, as is indicated, by which the tractor operator can raise and lower the three point system. The said three points of attachment are remote by the links 10-12 and thereby disposed in a substantially vertical plane rearward of the tractor to carry the A-frame 13 to which implements are attached as may be required, and which is characteristically combined with a transverse implement bar 14. The parts and elements 10-14 are permanently installed features of the tractor which are not to be interfered with or encumbered.

In accordance with this invention, I provide a boom attachment which involves, generally, a base B to be permanently secured to the A-frame 13, an adaptor A hinged to the base, and an actuating means C operable between the base and adapter to lift the boom D replaceable on said adapter. The base B is secured to the A-frame 13 as by welding, the said A-frame being comprised of a pair of downwardly divergent legs 15, thereby forming a triangle to reach the three points of attachment a, b, and c (see FIG. 4). As shown, the apex of the A-frame 13 involves spaced vertically disposed head portions of the legs 15, to form a clevis to receive a pivot pin 16 and the hitch end of the upper link 10. The bottom of the A-frame 13 involves spaced vertically disposed ear portions of the legs 15, to form spaced lugs to receive coaxial pivot pins 17 and 18 and the hitch ends of the lower links 11 and 12 respectively. The legs are joined as a unit structure made of heavy bar-stock presenting the rearward edges thereof in a flat vertically disposed plane x. It is this plane x to which the boom attachment is applied, with access through the open configuration of said A-frame 13.

The base B can vary in construction and is preferably made in the same manner as the above described A-frame 13. That is, heavy bar-stock or plate is employed in its structure which involves a hinge member 20 and a header 21 spaced forwardly from the hinge member by struts 22 and 23. The hinge member 20 provides an axis y at the attachment point a (a and y can be coincidental if so desired) and is preferably a U-shaped member with spaced rearwardly extended ears 24 through which a hinge pin 26 extends to carry the adapter A. Extending between the ears 24 there is a flat plate 25 which is secured against the plane x and legs 15 as by welding.

Header 21 is supported directly from the hinge member 20 by said upper and lower struts 22 and 23 which embrace the A-frame 13, to be installed thereover, said struts being convergent to the header from the upper and lower portions of said A-frame legs respectively. In practice, the struts 22 and 23 are secured to the header as by welding and extend freely to be secured to the A-frame legs 15 as by welding upon assembly with said A-frame. The header 21 is a T-shaped member that presents a vertically disposed flange 27 projecting rearwardly and exposed to the open access within the A-frame 13. The flange 27 carries a clevis pin 28 on an axis z to anchor the actuating means C, later described.

The adapter A is rotatably journaled to the base B by the hinge pin 26 on the transverse horizontal axis y, and is characteristically of bellcrank form with right angularly related arms 30 and 31 projecting from a bearing sleeve 32. The sleeve 32 rotates on the hinge pin 26 and between the ears 24, the arm 30 swings upward from a rearwardly extended horizontal position, and the arm 31 swings rearward from a depending position. In practice, the arms 30 and 31 comprise a plate that extends as a brace between the extremes of said arms, between an actuator pin 33 and a stop shoulder 34, both spaced from the axis y. The adaptation feature is in the stub bar 35 right angularly related to the axis y and bearing sleeve 32 and extending along the upper margin of the said plate to form the lift arm 31. As shown, the stub bar 35 extends substantially beyond the shoulder 34 so as to enter the open end of the replaceable boom D stopped against said shoulder.

The actuating means C can be any extensible device or strut adapted to controllably determine the distance between the axis z and the actuator pin 33. In its preferred form, the actuating means C is a hydraulic cylinder and piston unit with its cylinder clevis 36 secured to the axis z by the pin 28, and with its piston clevis 37 secured to the lever arm 31 by the pin 33. It will be seen that the arm 31 is adapted to swing effectively through a substantial arc of about 45°.

From the foregoing it will be seen that a tubular boom D is readily installed over the projecting stub end of the bar 35. The remote outer end of the boom tube 38 is then open to receive a plug 40 into which a drop line 41 is secured and depends to be fastened by hooks or the like into and to raise a load. As is indicated, the cylinder and piston unit of means C is double acting and is controlled by the usual valve means (not shown) to position the adapter A as may be required for placement of the boom D. Combined with the arcuate motion of the boom, the position of A-frame 13 is controlled by the usual valve means (not shown) to move the boom attachment vertically with consequent vertical lifting and/or lowering of the load; all with the use of a drop line 41 of fixed length.

Having described only a typical preferred form and application of my invention, I do not wish to be limited or restricted to the specific details herein set forth, but wish to reserve to myself any modifications or variations that may appear to those skilled in the art:

I claim:

1. An attachment for the vertically moveable three point hitch of tractors and the like, and including; a base comprised of a hinge member secured to the moveable three points of said hitch and with a hinge pin on a transverse horizontal axis and a header spaced forwardly from the hinge member and said hinge pin by means of struts converging from said three points and providing an anchor, a boom adapter rotatable on the hinge pin of the base and comprised of lever means to move about said axis, an actuator means operable between the said anchor of the base and said lever means to move the boom adapter, and a lift boom projecting from the adapter to move vertically both by means of said actuator means and by means of said moveable three point hitch.

2. The three point hitch attachment as set forth in claim 1, wherein the boom adapter includes a stub for the removeable reception of the lift boom.

3. The three point hitch attachment as set forth in claim 1, wherein the boom adapter includes a stub and a stop shoulder for the replaceability of the lift boom in the form of a tubular member engageable thereover and against said stop shoulder.

4. The three point hitch attachment as set forth in claim 1, wherein the actuator means comprises an extensible hydraulic cylinder and piston unit extended between the said anchor of the base and the said lever means of the adapter.

5. The three point hitch attachment as set forth in claim 1, wherein the actuator means comprises an extensible hydraulic cylinder and piston unit extended between the said anchor of the base and the said lever means of the adapter, and wherein the boom adapter includes a stub and a stop shoulder for the replaceability of the lift boom in the form of a tubular member engageable thereover and against said stop shoulder.

6. In combination with a vertically moveable three point hitch for tractors wherein actuator means positions three vertically adjustable trailing links carrying an A-frame, an attachment therefor including, a base comprised of a hinge member secured to the A-frame and with a hinge pin on a transverse horizontal axis and a header spaced forwardly from the hinge member and said hinge pin by means of struts converging from said three points and providing an anchor, a boom adapter rotatable on the hinge pin of the base and comprised of lever means to move about said axis, an actuator means operable between the said anchor of the base and said lever means to move the boom adapter, and a lift boom projecting from the adapter to move vertically both by means of said actuator means and by means of said moveable three point hitch.

7. The combination of a three point tractor hitch and the attachment as set forth in claim 6, wherein the boom adapter includes a stub for the removeable reception of the lift boom.

8. The combination of a three point tractor hitch and the attachment as set forth in claim 6, wherein the boom adapter includes a stub and a stop shoulder for the replaceability of the lift boom in the form of a tubular member engageable thereover and against said stop shoulder.

9. The combination of a three point tractor hitch and the attachment as set forth in claim 6, wherein the actuator means comprises an extensible hydraulic cylinder and piston unit extended between the said anchor of the base and the said lever means of the adapter.

10. The combination of a three point tractor hitch and the attachment as set forth in claim 6, wherein the actuator means comprises an extensible hydraulic cylinder and piston unit extended between the said anchor of the base and the said lever means of the adapter, and wherein the boom adapter includes a stub and a stop shoulder for the replaceability of the lift boom in the form of a tubular member engageable thereover and against said stop shoulder.

* * * * *